(12) United States Patent
Mattioni et al.

(10) Patent No.: US 11,606,993 B2
(45) Date of Patent: Mar. 21, 2023

(54) BREATHABLE ITEM OF CLOTHING AND BREATHABLE INSERT FOR ITEMS OF CLOTHING

(71) Applicant: GEOX S.p.A., Montebelluna (IT)

(72) Inventors: Bruno Mattioni, Montebelluna (IT); Marco Bruno, Ivrea (IT); Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 256 days.

(21) Appl. No.: 16/615,537

(22) PCT Filed: Apr. 17, 2018

(86) PCT No.: PCT/EP2018/059732
§ 371 (c)(1),
(2) Date: Nov. 21, 2019

(87) PCT Pub. No.: WO2018/215138
PCT Pub. Date: Nov. 29, 2018

(65) Prior Publication Data
US 2020/0170325 A1  Jun. 4, 2020

(30) Foreign Application Priority Data

May 24, 2017 (IT) ........................ 102017000056188

(51) Int. Cl.
*A41D 27/28* (2006.01)
*A41D 31/102* (2019.01)
(Continued)

(52) U.S. Cl.
CPC ........... *A41D 27/28* (2013.01); *A41D 31/102* (2019.02); *A41D 31/145* (2019.02); *B32B 3/266* (2013.01);
(Continued)

(58) Field of Classification Search
CPC .... A41D 27/28; A41D 31/145; A41D 31/102; A41D 3/02; A41D 31/14; B32B 3/266;
(Continued)

(56) References Cited

U.S. PATENT DOCUMENTS

| | | | |
|---|---|---|---|
| 5,515,543 A * | 5/1996 | Gioello | A41D 27/28 2/69 |
| 6,263,511 B1 * | 7/2001 | Moretti | A41D 31/102 2/97 |
| 9,474,312 B2 * | 10/2016 | Ulriksen | A41D 31/145 |

FOREIGN PATENT DOCUMENTS

| | | |
|---|---|---|
| CN | 100401932 C | 7/2008 |
| CN | 101404903 A | 4/2009 |

(Continued)

OTHER PUBLICATIONS

International Search Report and Written Opinion dated Jun. 8, 2018 in PCT/EP2018/059732 filed on Apr. 17, 2018.
Combined Chinese Office Action and Search Report dated Mar. 3, 2021 in Chinese Patent Application No. 201880034463.6 (with English translation), 13 pages.

(Continued)

*Primary Examiner* — Elizabeth C Imani
(74) *Attorney, Agent, or Firm* — Oblon, McClelland, Maier & Neustadt, L.L.P.

(57) ABSTRACT

A breathable item of clothing and a breathable insert for items of clothing, the item of clothing includes an external enclosure, the surface of which has at least one opening for evacuating perspiration in the vapor phase in an upper region of the item of clothing, a breathable external covering having a structure for the external retention of water, impurities or others, an internal layer to be directed toward the body of the user of the item of clothing, forming an interspace due to the spacing of the external covering from the body of the user, for the passage of perspiration in the (Continued)

vapor phase, produced by the body and channeled within the interspace, to the external covering. The external covering, structure for external retention of water, impurities or others, and the internal layer are placed in a breathable preassembled insert.

13 Claims, 5 Drawing Sheets

(51) Int. Cl.
*A41D 31/14* (2019.01)
*B32B 5/02* (2006.01)
*B32B 27/12* (2006.01)
*B32B 3/26* (2006.01)
*A41D 3/02* (2006.01)

(52) U.S. Cl.
CPC .............. *B32B 5/026* (2013.01); *B32B 27/12* (2013.01); *A41D 3/02* (2013.01); *B32B 2307/724* (2013.01); *B32B 2437/00* (2013.01); *D10B 2403/021* (2013.01); *D10B 2403/022* (2013.01); *Y10T 442/40* (2015.04)

(58) Field of Classification Search
CPC .................... B32B 5/026; B32B 27/12; B32B 2307/724; B32B 2437/00; Y10T 442/40; D10B 2403/021; D10B 2403/022
See application file for complete search history.

(56) References Cited

FOREIGN PATENT DOCUMENTS

| | | |
|---|---|---|
| EP | 2 007 235 A1 | 12/2008 |
| JP | 2000-170019 A | 6/2000 |
| JP | 2003-503607 A | 1/2003 |
| JP | 2009-530139 A | 8/2009 |
| JP | 2015-92035 A | 5/2015 |
| JP | 2015-108203 A | 6/2015 |
| WO | WO 01/01803 A1 | 1/2001 |
| WO | WO 2007/107264 A1 | 9/2008 |

OTHER PUBLICATIONS

Office Action dated Jul. 19, 2022, in corresponding Japanese Patent Application No. 2019-564508 (with English Translation), 6 pages.

* cited by examiner

BREATHABLE ITEM OF CLOTHING AND BREATHABLE INSERT FOR ITEMS OF CLOTHING

The present invention relates to a breathable item of clothing and to a breathable insert for items of clothing.

As is known, the human being, in order to protect his/her body from atmospheric agents such as snow, rain, wind and in particular from the cold, wears items of clothing and shoes.

Protection of the human body occurs mainly by resorting to various layers of clothing, the first of which, the underwear, is in direct contact with the body and in turn is covered by successive layers as a function of the external temperature and of the environmental conditions.

Therefore, it is sufficient to add or remove one or more layers of clothing in order to be at an optimum temperature.

The human body is inherently provided with mechanisms that help it to adapt thermally in the environment in which it is placed.

The human being in fact has a self-regulation system which keeps the internal temperature of the body at a value of approximately 37° C. When the temperature increases excessively, two processes are activated: initially, dilation of blood vessels causes an increase in blood flow in the skin, then sweating begins. Sweating is an excellent cooling method, since the energy used by perspiration to evaporate is removed from the skin. An increase in internal temperature of a few tenths of a degree can stimulate sweating, which quadruples the dispersion of energy from the body. If the internal temperature decreases excessively, the first reaction is vasoconstriction, which reduces blood flow in the skin. The second reaction is increased generation of energy inside the body, which occurs by acting on the muscles therefore by activating shivering. This system also is efficient and can increase drastically energy production. The control system that regulates the body temperature is very complex; the two main groups of sensors of the control system are known and are arranged in the skin and in the hypothalamus.

The sensor located in the hypothalamus is activated in hot conditions and triggers the defense mechanism against heat when the internal temperature rises above 37° C. The sensors located in the skin are sensitive to the cold and activate the defense mechanism against cold when the temperature of the skin drops below 34° C. If the sensors send signals simultaneously, the brain of the human being inhibits one or both of the defense reactions.

The heat generated by the human body, in addition to producing perspiration, is also transferred externally by radiation.

This heat, which is always present, produces a heating of the air contained between the body and the item of clothing, and this air, by rising, causes further overheating and discomfort, for example at the shoulders and at the back, which constitute accumulation regions.

In order to obviate this drawback, it is necessary to produce or maximize the exchange of air (substantially a ventilation effect) inside the item of clothing independently of the release of vapor, using the differences in pressure that occur between the inside and the outside of the item of clothing.

For example, with an external temperature of 5° C. and a relative humidity of 50%, with an internal temperature at 25° C. and a relative humidity equal to 90%, the resulting difference in pressure is approximately 24 millibars, a far from negligible factor.

If the water vapor is unable to exit from the protective enclosure that wraps the human body (the clothes), the humidity increases until the vapor condenses and returns to the liquid state of perspiration, soaking the items of clothing themselves starting from the underwear that constitutes the first layer.

This unpleasant drawback can be remedied by removing the wet item of clothing to replace it with a dry one, for example after a challenging mountain climb, but by doing so a sudden cooling of the body occurs and there is the danger of pneumonia and of other cold-related diseases.

While on the one hand the protection of the human body against the most severe cold conditions is very effective by virtue of the use of highly thermally insulating materials, on the other hand one cannot avoid stressing the inability to allow the body its normal perspiration, ensuring the outflow of the water vapor produced by sweating.

Clearly, during the warm season the problem is felt more and forces many people to take many showers in the course of a day and change their clothes continuously.

An attempt has been made to solve these drawbacks by creating in items of clothing openings which can be more or less closed at the regions with higher concentration of perspiration, for example under the armpits. However, this does not ensure particular effects, since the openings have not been found able to ensure effective exchange of the air inside the item of clothing.

Even providing a larger number of openings also has not produced satisfactory results.

In practice, as a matter of fact, some parts of the items of clothing always cling directly to the body, in particular to the shoulders and to the cervical region, and therefore the water vapor generated by the evaporation of the perspiration of the body remains trapped between the body itself and the regions of the items of clothing that do not adhere directly to it (generally the region of the belly, the lumbar region of the back, and especially the region below the armpits), preventing its outflow.

Other known solutions provide for openings on the front of the item of clothing, on the lateral part and on the back, in order to create ventilation and avoid the condensation of the water vapor generated by perspiration inside the item of clothing. However, these solutions have proved themselves rather expensive and lengthen considerably the process for the manufacture of the item of clothing.

Items of clothing have therefore been devised in which the expulsion of humid warm air occurs mainly by utilizing the natural tendency of humid warm air to rise (by convection).

In particular, U.S. Pat. No. 4,452,034 contains the teachings for providing, inside an item of clothing, channels that are crossed upward from below by humid warm air, but it exposes the item of clothing to the infiltration of liquids, for example water, from the outside inward through the open ends.

The technical solution proposed in EP1194049 solves the drawback cited above by proposing the provision of an item of clothing that comprises a protective external enclosure with an internal layer that forms an interspace inside it. The internal layer has, at least at the regions of the human body that are most subject to sweating, holes for access to the interspace for the humid warm air, which is channeled inside the interspace by utilizing the "stack effect" of convection. The internal layer and the external enclosure have, in the apex region of the item of clothing, holes for the evacuation of the humid warm air which are combined with means for external retention of water, impurities or others.

This solution is not free from drawbacks, such as the constructive difficulties of the item of clothing, caused by the fact that in order to maintain the interspace it is necessary to couple, in addition to the internal layer and the external enclosure, also an intermediate layer, constituted for example by the fabric described in EP2007235, in the name of the same Applicant, which prevents the interspace from collapsing. This entails the need to use and handle, during manufacture, at least one additional intermediate layer with respect to traditional processing, which instead provides for an internal layer and an external enclosure, significantly increasing the operations for the manufacture of the item of clothing, since this entails the introduction of complex solutions. In fact, in order to prevent the intermediate layer from being visible from the outside, the external fabrics must have an adequate thickness. This entails important limitations to the styling freedom and fit, due to an overall stiffening of the item of clothing.

Furthermore, in order to manufacture the item of clothing it is necessary that all the elements of which it must be composed are available simultaneously, preventing the deferment of some operations and therefore the delocalization of individual production activities, in addition to preventing the application of inventory logic systems which currently seek ever greater flexibility in production.

Another drawback is linked to production waste, which is a consequence for example of the cutting operations, which forces to provide the manufacturers of items of clothing with overabundant quantities of material. This entails difficulty in monitoring the actual use of the material exclusively for the official production contracted out by the supplier.

Moreover, often in order to provide breathable items of clothing it is necessary to use interlinings, having a modest thickness, which are usually sewn along one side of the fabric, typically a three-dimensional fabric, which provides an interspace for the passage of the perspiration in the vapor phase, and along one side of the lining or of the external enclosure. These interlinings are used to avoid having to sew directly the three-dimensional fabric to the lining or to the external enclosure of the item of clothing. The three-dimensional fabric in fact has a significantly greater thickness than the lining and sewing together materials of very different thicknesses often entails the creation of creases and folds, due to relative slippage between the materials, which make it difficult to provide the stitched seam according to best manufacturing practice, compromising the aesthetics of the final product.

Furthermore, cuts and stitched seams are often required on the outer enclosure of the item of clothing in order to hide the steps caused by the transition between regions of the item of clothing that comprise the three-dimensional fabric and regions that lack it.

Stitched seams which join distinct portions of three-dimensional fabric are also necessary, interrupting the continuity of the passages for vapor and creating false hems which, by overlapping the retention means, compromise their operation.

The aim of the present invention is to provide an item of clothing that is capable of improving the background art in one or more of the aspects indicated above.

Within this aim, an object of the invention is to ensure an adequate exchange of air inside the item of clothing.

Another object of the invention is to propose an insert by means of which an item of clothing is provided which lacks complex systems for regulation of perspiration and require user intervention.

A further object of the invention is to provide an item of clothing which, while ensuring perspiration, with the escape of water vapor produced by sweating, prevents infiltrations of water from outside.

Another object of the invention is to provide an insert that can be applied simply and rapidly to any coat or jacket or other manufacture, to allow natural ventilation by utilizing the "stack effect", i.e., the natural tendency of warm air to move upward.

Another object of the invention is to provide an insert that can be applied in numerous types of items of clothing, be they sports, formal or casual.

The present invention, furthermore, has the object of overcoming the drawbacks of the background art in a manner which is alternative to any existing solutions.

A still further object of the invention is to provide an item of clothing that is highly reliable, relatively easy to provide and at competitive costs.

This aim, as well as these and other objects which will become better apparent hereinafter, are achieved by an item of clothing according to claim 1, optionally provided with one or more of the characteristics of the dependent claims.

Further characteristics and advantages of the invention will become better apparent from the description of a preferred but not exclusive embodiment of the item of clothing according to the invention, illustrated by way of nonlimiting example in the accompanying drawings, wherein.

Figure 1:
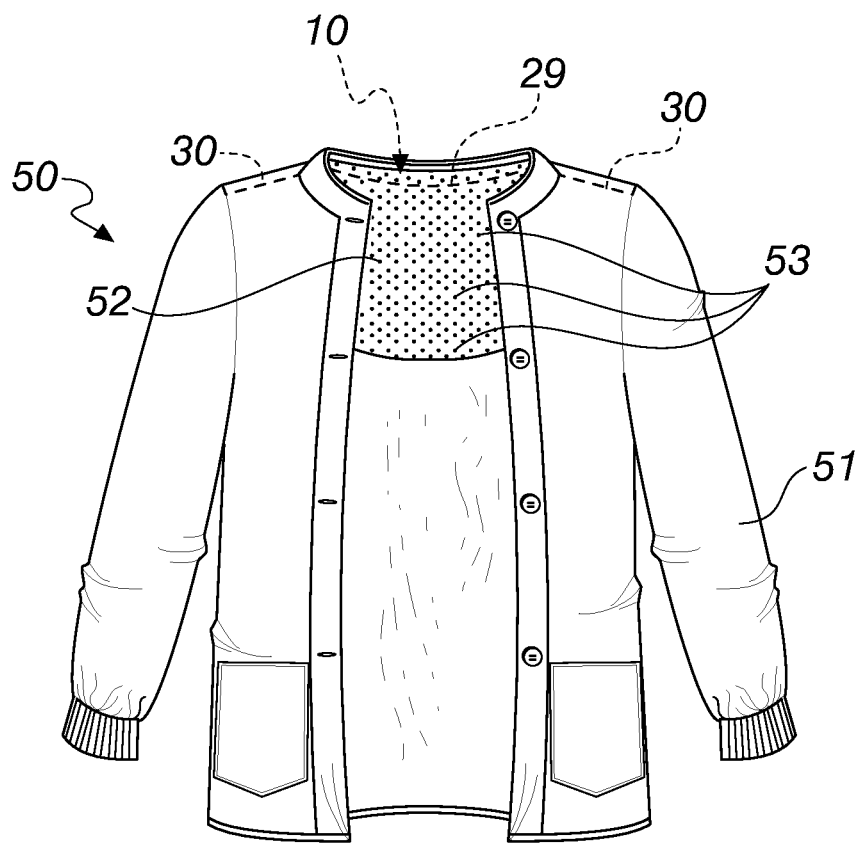
FIG. 1 is a view of an item of clothing according to the invention, taken from the front part.

With reference to the cited figures, the item of clothing according to the invention, designated generally by the reference numeral 50, is breathable and comprises:

- an external enclosure 51, the surface of which has at least one opening for the evacuation of perspiration in the vapor phase, in an upper region of the same item of clothing 50,
- a breathable external covering 11, which comprises means 12, 112 for the external retention of water, impurities or others,
- an internal layer 13, to be directed toward the body of the user of the item of clothing 50, which forms an interspace by virtue of means 16, 116, 216 for spacing the external covering 11 from the body of the user, for the passage of the perspiration in the vapor phase, produced by the body, and channeled within the interspace, to the external covering 11. The internal layer 13 does not overlap with the external enclosure 51.

The external covering 11, the means 12, 112 for the external retention of water, impurities or others and the internal layer 13 are arranged in a breathable preassembled insert 10, which is arranged at the at least one opening and is adapted to form for it a protection and a support both during assembly and during operation.

The insert 10 is joined along the perimeter of the opening, for example by means of a method chosen among the following: sewing, adhesive bonding, heat sealing, high-frequency welding. Furthermore, in case of a stitched seam, it is possible to apply waterproofing tapes at said stitched seam.

In the case shown (FIGS. 1, 2 and 3), the item of clothing 50 according to the invention consists of a jacket.

The external enclosure 51 is preferably water-repellent and optionally also waterproof, in case a waterproof and breathable membrane is joined to it on the internal side of the item of clothing 50.

Figure 4:
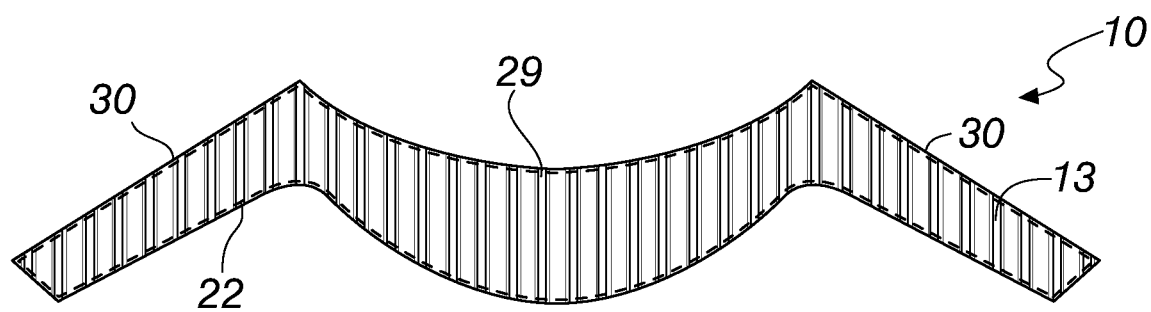
FIG. 4 is a front view of an insert.
Figure 5:
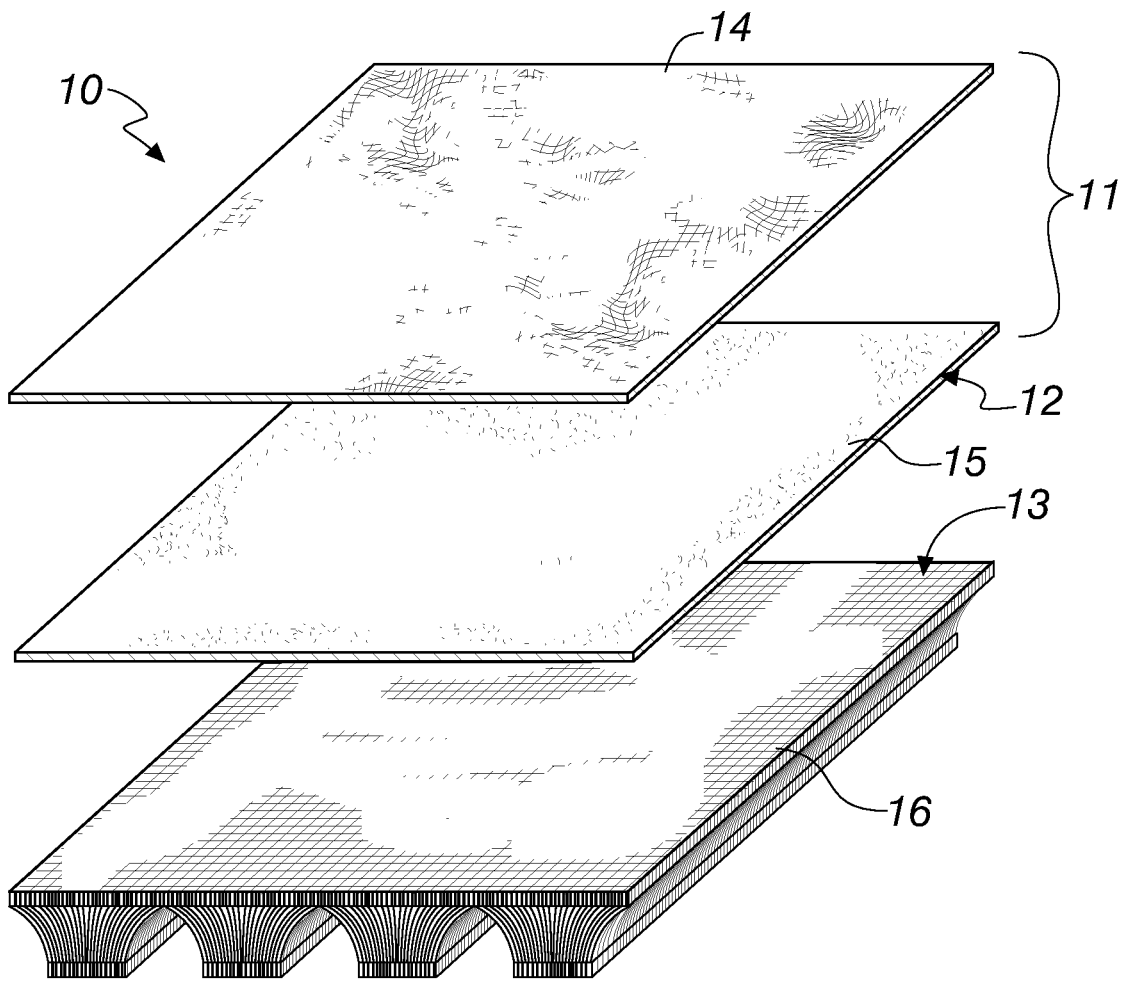
FIG. 5 is an exploded perspective view of a portion of insert.

The structure of the insert 10 is clearly visible in FIGS. 4 and 5.

The spacer means 16 can consist, by way of example, of pins or strips interposed between the external covering and the internal layer (for example molded or heat-sealed to either the covering or the layer).

In a preferred and illustrated embodiment, the internal layer 13 is coupled to the external covering 11 and forms, with its structure, the spacer means 16, 116, 216. In this case, said spacer means 16, 116, 216 can be preferably and conveniently constituted by a three-dimensional fabric.

Preferably, the external covering 11 comprises an external layer 14 that is at least breathable, and is designed to be directed toward the outside environment in the application of the insert 10 to the item of clothing 50, and the retention means 12 comprise a waterproof and breathable functional layer 15.

The external layer 14 is preferably also water-repellent.

The external layer 14 is also constituted for example by a fabric made of natural or synthetic material, with the function of protecting the functional layer 15 for example against impacts with external objects and of allowing the provision of a wide range of aesthetic variations (for example with different colors and ornamental patterns).

The functional layer 15 comprises a membrane which is permeable to vapor and/or air and impermeable to water.

It can be made for example of a material chosen among expanded polytetrafluoroethylene (ePTFE in acronym), polyurethane (PU in acronym), polyethylene (PE in acronym), polyester (PES in acronym), or other polymeric materials.

An element is impermeable to water if less than three crossing points are detected when it is subjected to a column of water of at least 1000 mm. More particularly, waterproofness is evaluated as resistance of the specimen to the penetration of water under pressure according to the EN 20811:1992 standard. A specimen of material having a surface of 100 cm$^2$ is fixed in the test head in a horizontal position so as to not slip between the clamps and without forming protrusions; moreover, there must be no water leakage at the clamps. The specimen is subjected to a water column that increases constantly and acts above or below the specimen. The distilled or deionized water is at a temperature of 20±2° C. or 27±2° C., and the rate at which the water column increases is 10±0.5 cmH$_2$O/min or 60±3 cm H$_2$O/min, where 1 cmH$_2$O is equivalent to approximately 1 millibar.

Hereinafter, the term "waterproof" is understood to mean impermeable to water.

Vapor permeability is determined according to the method described in chapter 6.6 of the ISO 20344-2004 standard. The ISO 20344-2004 standard, in chapter 6.6 "Determination of water vapour permeability", related to safety shoes, describes a test method that consists in fixing a specimen of the material being tested so as to close the opening of a bottle that contains a certain quantity of solid desiccant, i.e., silica gel. The bottle is subjected to an intense air current in a conditioned atmosphere. The bottle is turned so as to stir the solid desiccant and optimize its action of drying the air contained in the bottle. The bottle is weighed before and after the test period to determine the mass of humidity that has passed through the material and has been absorbed by the solid desiccant. The permeability to water vapor, expressed in milligrams per square centimeter per hour [mg/cm$^2$·h], is then calculated on the basis of the mass of humidity that has been measured, of the area of the opening of the bottle, and of the test time.

The terms "permeable to vapor" and "breathable" are used alternately hereinafter with the same meaning.

An element is water repellent if it is capable of making a drop of water glide on its surface, since a very high angle of contact is generated between the surface and the drop which does not allow absorption on the part of the material in the absence of hydrostatic pressure. Differently from an element that is waterproof, a water-repellent element is unable to withstand the penetration of water in the presence of hydrostatic pressure. The water repellence characteristic, obtained for example by means of a finishing treatment which transforms the water that strikes the fabric into droplets which glide on the surface instead of penetrating the fabric, is destined to fade over time or in the presence of dry-cleaning.

The functional layer 15, being waterproof, constitutes a means for the external retention of water, while it allows the passage of water vapor: in this manner, when the insert 10 is applied to an item of clothing, the water that arrives from the outside, for example in the form of rain, cannot penetrate through the insert, while the perspiration in the vapor phase, which originates from the body of the user of the item of clothing, can exit externally, ensuring natural thermoregulation of the body and ventilation of the item of clothing.

The retention means 12, in addition to the functional layer 15, can also comprise, for the latter, a supporting layer, not shown, which is directed toward the external layer 14 or toward the internal layer 13. The supporting layer supports the functional layer 15, and if it faces the internal layer it can facilitate the adhesive bonding of the functional layer to the latter.

This supporting layer can be made for example of fabric or nonwoven fabric, protecting the functional layer 15 against degradation or possible contact with blunt objects that can ruin it.

The item of clothing 50 according to the invention can advantageously comprise also a breathable lining, which is not shown and is of the per se known type, adapted to cover at least partially the internal layer 13 on the side directed toward the user, which allows dual use of a reversible item of clothing to which the insert 10 might be applied.

This lining is conveniently provided with holes for the passage of perspiration in the vapor phase, produced by the body of the user of an item of clothing to which the insert 10 is applied, to the interspace.

The item of clothing 50 can also advantageously comprise, substantially in the insert 10, a layer of padding between the retention means 12 and the interspace.

As mentioned earlier, the internal layer 13 can form with its structure the spacer means 16, 116, 216 and in this case they are constituted conveniently by a three-dimensional fabric. The three-dimensional fabric thus produces the presence of the interspace, occupying a volume that is filled by air for a significant portion.

The term "three-dimensional fabric" is commonly understood to reference a single fabric the component fibers of which are arranged in a mutually perpendicular planar relationship. From the point of view of the production process, in a weave of the 3D type, the sets of fibers X and Y are woven with the rows and columns of the actual fibers Z. The expression "sets of fibers X and Y" is understood to reference respectively the horizontal and vertical weft sets. The term "fibers Z" is understood to reference the multilayer warp set. It is possible to obtain three-dimensional fabrics also with weaving processes of the 2D type. The three-dimensional fabric can also be obtained by knitting on flat or circular knitting machines.

Figure 6:
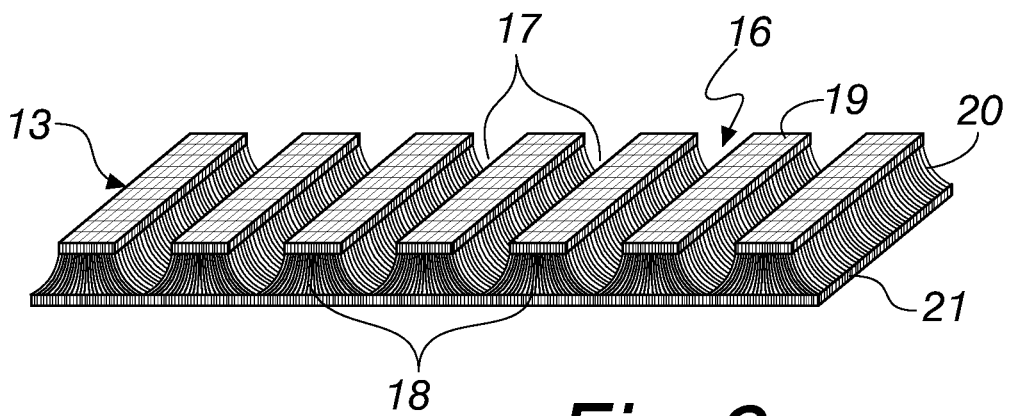
FIG. 6 is a view of a first variation of internal layer of the insert.

The three-dimensional fabric shown in FIG. 6 has, as spacer means 16, preferential passages for perspiration in the vapor phase which are formed by a series of channels 17. In particular, in this variation it has ribs 18, interleaved by the channels 17 which form preferential passages for perspiration, to be directed, in the application of the insert 10 to the item of clothing 50, toward the body of the user and extended predominantly in a vertical direction upward from below.

Figure 2:
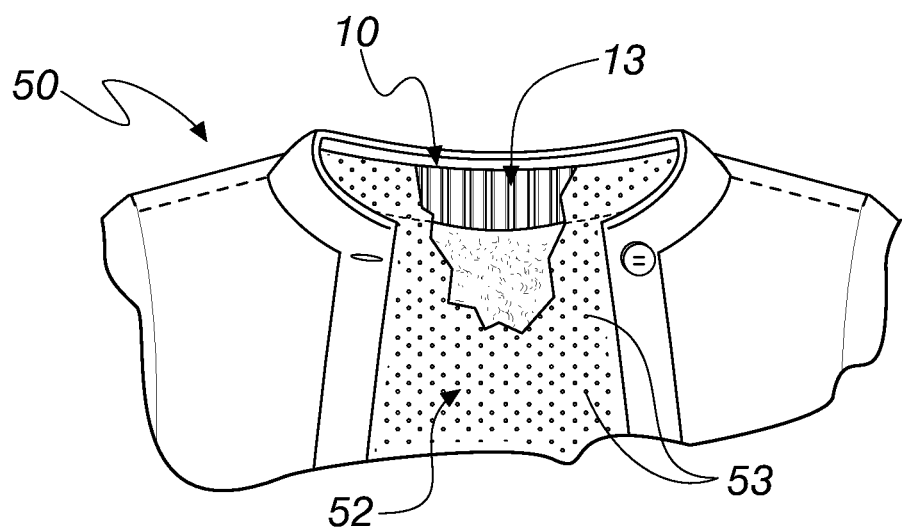
FIG. 2 is an enlarged-scale view of a part of the item of clothing shown in FIG. 1, in which the internal layer of the insert is made visible.
Figure 3:
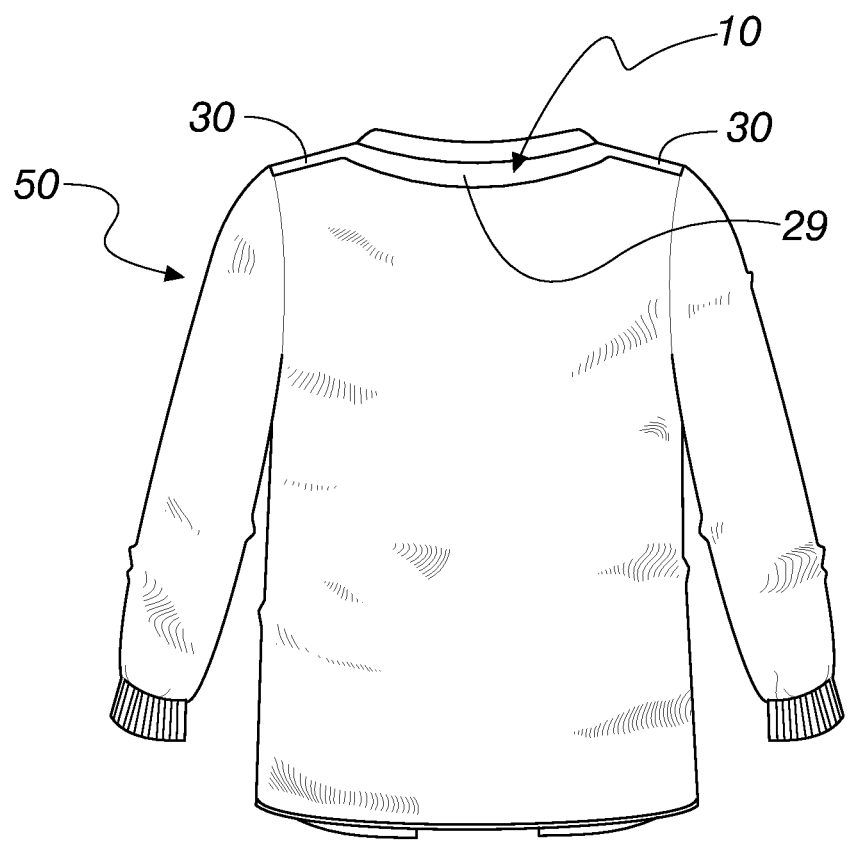
FIG. 3 is a view of the same item of clothing as FIG. 1, seen from the rear part.

The insert 10 in fact must be applied to the item of clothing with the channels 17 in a position which is predominantly vertical with respect to the position of use of the item of clothing being worn. In this manner they form preferential passages for the humid warm air, which must exit externally by passing through the retention means 12. FIGS. 1 to 3 show the application of the insert 10 to an item of clothing 50, which will be described in greater detail hereinafter, and in particular in FIG. 2 the internal layer 13 is made visible, showing the vertical position of the channels 17.

The three-dimensional fabric comprises, as clearly visible in FIG. 6:
  a first layer 19, to be directed toward the body of the user, which is breathable and adapted to direct perspiration, in the liquid phase and in the vapor phase, away from the body of the user,
  a second intermediate and spacing layer 20, which forms the interspace and the ribs 18, for the transfer of the perspiration in the vapor phase from the first layer 19 outward, since the ribs 18 are alternated with the channels 17,
  a breathable third layer 21, which is substantially similar to the first layer 19 and closes the second layer 20 with it in a sandwich-like manner.

The first layer 19 is constituted by strips of fabric, each of which is arranged so as to affect a corresponding rib 18. The first layer 19, and therefore the strips that compose it, as well as the second layer 20, are preferably made of fibers of polyester or polypropylene or optionally other equivalent fibers.

Preferably, the first layer 19 is hydrophobic, so as to facilitate the passage (instead of braking it, as would occur if it were instead hydrophilic) of perspiration in the liquid state from the body of the user toward the second layer 20 and toward the third layer 21. The second layer also is preferably hydrophobic or hydrophilic, depending on the perspiration transfer rate that one wishes to give to the system. In this manner, the perspiration in the liquid phase passes in the first layer 19, which is hydrophobic and therefore preset to let the liquid pass, and passes through the ribs 18 of the second layer 20, reaching the third layer 21. The third layer 21 is preferably hydrophilic, so that the perspiration in the liquid phase diffuses, arranging itself on the largest available surface, thus being able to evaporate more easily.

The internal layer 13 is coupled to the functional layer 15 preferably by means of an adhesive layer that is interposed between the two.

In particular, the coupling can be achieved by means of a double adhesive, which is provided with a protective film to be removed before coupling to the functional layer 15. As an alternative, coupling can occur by sewing or high-frequency welding.

Also as an alternative, the internal layer 13 is coupled to the functional layer 15 by adhesive bonding, with glue arranged in spots or according to a preset model, for example strips or meshes, and can be activated thermally.

Adhesive coupling is advantageous, since it does not entail the perforation of the functional layer 15, as instead occurs with sewing, avoiding subsequent operations for waterproofing the functional layer 15.

In general, all the coupling methods, cited or equivalent, must not prevent insert 10 from being breathable.

The external covering 11, the internal layer 13 and the optional lining are joined preferably by means of a perimetric stitched seam 22, which is shown in FIG. 4.

Figure 7:
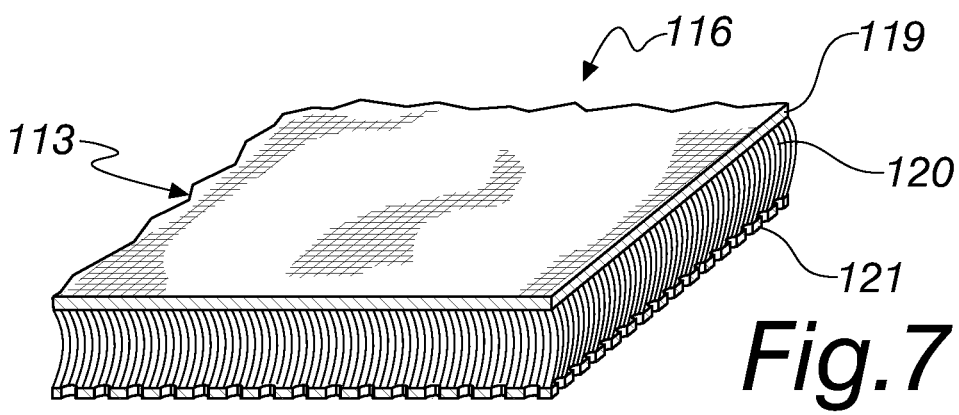
FIG. 7 is a view of a second variation of internal layer of the insert.

One possible variation of internal layer, which forms the spacer means 116 again constituted by a three-dimensional fabric, is shown in FIG. 7 and designated by the reference numeral 113. The three-dimensional fabric in this case comprises a layer 120 of pile-cloth material and in particular:
  a first layer 119, to be directed toward the body of the user, which is breathable and is adapted to direct perspiration, in the liquid phase and in the vapor phase, away from the body of the user,
  a second intermediate and spacing layer 120, which forms the interspace and is obtained by means of pile-cloth material, for the transfer of the perspiration in the vapor phase from the first layer 119 outward,
  a third breathable layer 121, which is substantially similar to the first layer 119 and closes the second layer 120 with it in a sandwich-like manner.

Figure 8:
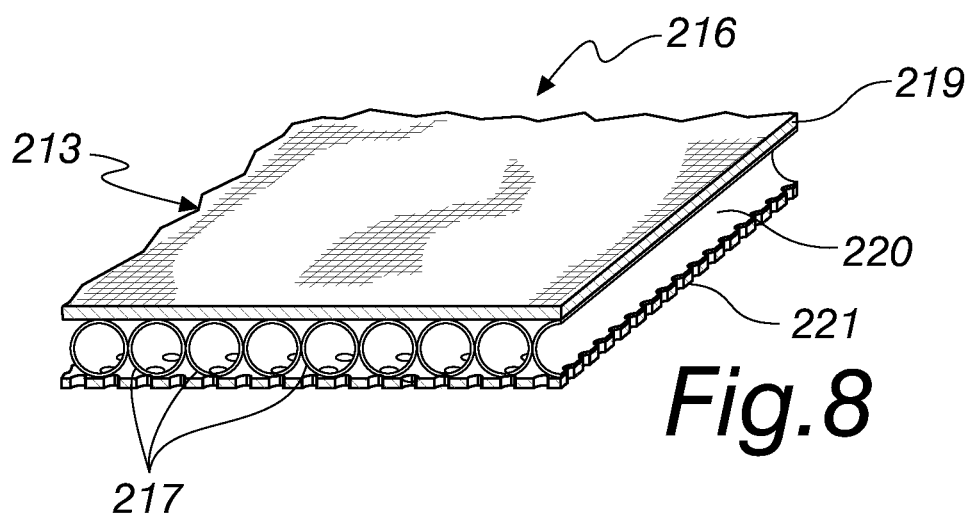
FIG. 8 is a view of a third variation of internal layer of the insert.

A further possible variation of internal layer, which forms the spacer means 216 again constituted by a three-dimensional fabric, is shown in FIG. 8 and is designated by the reference numeral 213. In this case, the three-dimensional fabric comprises a plurality of mutually laterally adjacent tubes 217, which is substantially replace the channels of the first variation.

This variation comprises:
  a first layer 219, to be directed toward the body of the user, which is breathable and adapted to direct perspiration in the liquid phase and in the vapor phase away from the body of the user,
  a second intermediate and spacing layer 220, which forms the interspace and is constituted by the plurality of tubes 217, which are mutually laterally adjacent so that the interspace is provided by the set of the passages inside each one of said tubes 217, for the transfer of the perspiration in the vapor phase from the first layer 219 outward,
  a third breathable layer 221, which is substantially similar to the first layer 219 and closes the second layer 220 with it in a sandwich-like manner.

In this case also, the insert 10 must be applied to the item of clothing so as to facilitate the upward passage of the vapor that passes through the interspace, therefore with the tubes 217 in a position that is predominantly vertical with respect to the position of use of the item of clothing when worn. In this manner they form preferential passages for the humid warm air, which can exit externally by passing through the retention means 12 and the external covering 11.

The external covering 11 can be provided conveniently with openings for the evacuation of the water vapor that is carried by the interspace.

In the regions of the external covering 11 in which there are the vapor evacuation openings, the retention means 12 can be constituted by one-way valves.

Figure 9:
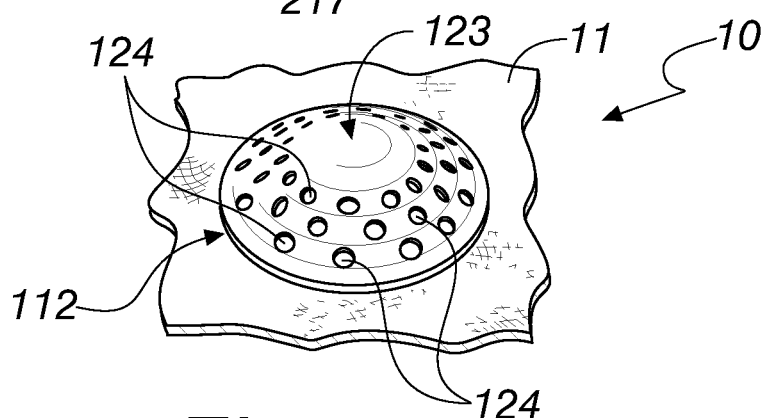
FIG. 9 is a view of a detail of a variation of retention means.
Figure 10:
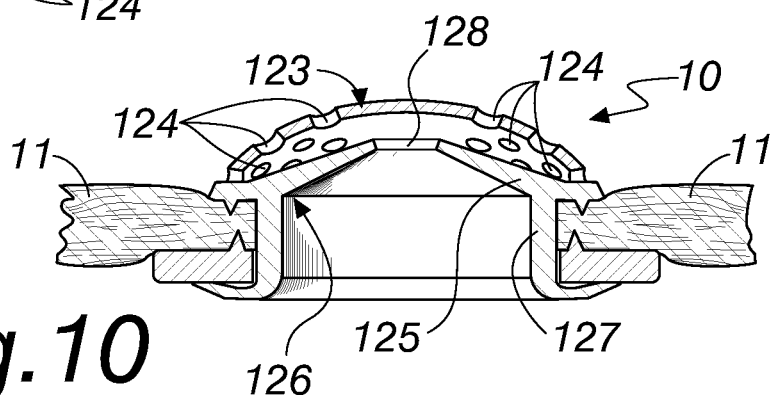
FIG. 10 is a sectional view of the same detail of FIG. 9.

According to another possible variation, the retention means, in this case designated by 112 and shown in FIGS. 9 and 10, again in the regions in which the vapor evacuation openings are provided, comprise a protective dome 123, on which holes 124 are provided which are uniformly distributed in regions other than the central one.

The dome 123 is fixed to the disk-like head 125 of a mushroom-shaped element 126 provided with a tubular stem 127.

In other cases, the head 125 can have a contour which is polygonal, oval, elliptical, etc.

The dome 123 is raised, except at the fixing regions, from the disk-like head 125.

The disk-like head 125 constitutes a ventilation element which has a frustum-like shape, which therefore is sloped toward the peripheral region and has, at the top region, a central opening 128, which in this case is circular. The mushroom-shaped element 126 is adapted to be associated with the external covering 11 at one of the openings that connect the interspace to the external environment.

In practice the retention means 112 allow the passage of water vapor, which can exit easily by passing through the holes 128 and 124, and at the same time the air from outside can enter the region below the external covering 11, so as to ensure optimum thermal ventilation of the human body. In case of rain, the water drops can penetrate through the holes 124 but are unable to pass beyond the opening 128, since it is not aligned with respect to the holes 124. Furthermore, by virtue of the frustum-shaped extension of the disk-like head 125 the drops glide towards its outside and exit through adapted holes 124 which are arranged along the perimeter of the protective dome 123.

In the preferred but not exclusive embodiment of the insert 10, it has such a shape, shown in FIGS. 1 to 4, as to comprise a central portion 29, which is adapted to occupy at least partially the cervical region of the item of clothing 50, and two wings 30 which extend on opposite sides of the central portion 29, each suitable to occupy at least partially the respective region of the back below the shoulders of said item of clothing 50. Its arrangement is clearly visible in the view of FIG. 3.

The item of clothing 50 advantageously comprises, in addition to the external enclosure, also a breathable internal lining 52, which, as shown in FIGS. 1 and 2, can also be extended at the insert 10, being interposed between it and the body of the user.

If the internal lining 52 is extended also at the insert 10, as in the illustrated case, it is conveniently provided with holes 53 for access to the interspace for the perspiration vapor.

Also in the illustrated example, the lining 52 is extended in the scapular region and optionally, in a manner which is not shown, in the front part of the jacket, again with fabric which is breathable and/or provided with holes.

A breathable insert 10 is also the subject matter of the patent and comprises:
 a breathable external covering 11, which comprises means 12, 112 for the external retention of water, impurities or others,
 an internal layer 13, to be directed toward the body of the user of an item of clothing to which said insert 10 is applied, forming an interspace by virtue of means 16, 116, 216 for spacing the external covering 11 from the body of the user, for the passage of perspiration in the vapor phase, produced by the body, and channeled inside the interspace, to the external covering 11.

The insert 10 preferably has the characteristics that have already been presented for it in the description of the item of clothing.

The operation of the item of clothing according to the invention is as follows.

During use of an item of clothing 50 to which the insert 10 is applied, such as the jacket in the illustrated example, the warm air inside the item of clothing 50 tends to rise, by its own nature, and is also pushed upward due to the pumping caused by the movements of the user of the item of clothing (for example the oscillating motion of the arms in the case of the jacket), carrying with it the perspiration in the vapor phase.

In the upper region the perspiration in the vapor phase passes through the internal lining 52 and reaches the insert 10.

In the insert 10, the vapor passes through the interspace, channeled for example in the channels 17 or by moving between the fibers of the pile-cloth material or by passing through the tubes 217, as a function of the type of three-dimensional fabric, to be conveyed to the external covering 11, from which it is expelled externally.

A further preferred embodiment of an item of clothing is constituted by a headgear 500.

Figure 11:
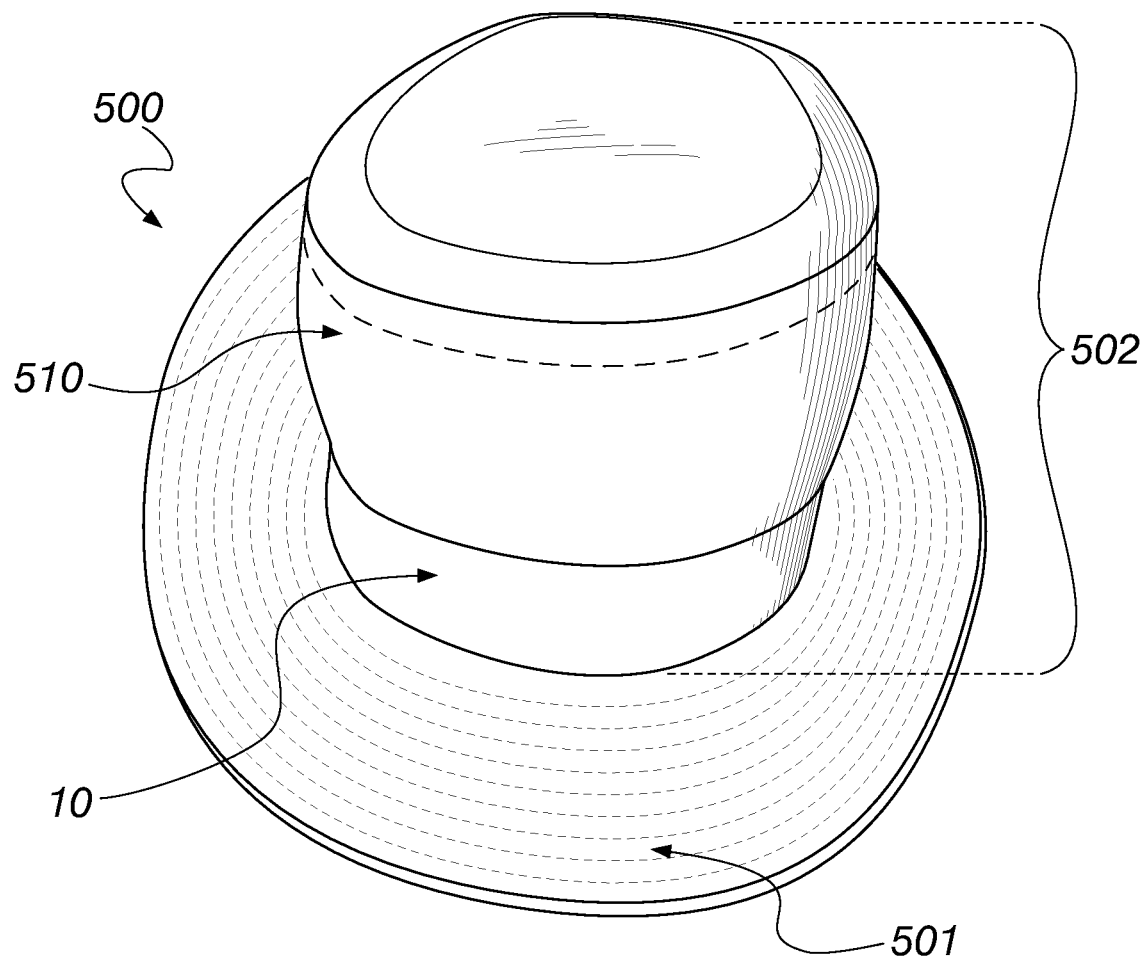
FIG. 11 is a view of a further item of clothing according to the invention, taken from the front part.

The headgear 500 shown in FIG. 11 comprises a brim 501 and a crown 502, the latter indicating the portion of the headgear 500 above the brim 501.

The headgear 500 is breathable and comprises:
 an external enclosure 510, the surface of which has at least one opening for the evacuation of perspiration in the vapor phase, in an upper region of the same headgear 500,
 a breathable external covering 11, which comprises means 12, 112 for the external retention of water, impurities or others,
 an internal layer 13, to be directed opposite to the external covering 11, which forms an interspace by virtue of means 16, 116, 216 for spacing the external covering 11 from the body of the user, for the passage of the perspiration in the vapor phase, produced by the body, and channeled within the interspace, to the external covering 11.

The external covering 11, the means 12, 112 for the external retention of water, impurities or others and the internal layer 13 are arranged in a breathable preassembled insert 10, which is arranged at the at least one opening and is adapted to form for it a protection and a support both during assembly and during operation.

The insert 10 is joined along the perimeter of the opening, for example by means of a method chosen among the following: sewing, adhesive bonding, heat sealing, high-frequency welding.

Furthermore, in case of a stitched seam, it is possible to apply waterproofing tapes at said stitched seam.

In FIG. 11 the insert 10 is placed at the lower part of the crown 502, but it can be conveniently placed at a different height of the crown 502, depending on the needs.

"Upper region" of the headgear is understood to mean the portion of the headgear above the brim 501, namely the crown 502.

During use of a headgear 500 to which the insert 10 is applied, such as the headgear in the illustrated example, the warm air inside the headgear 500 tends to rise, by its own nature, reaching the insert 10.

The outward expulsion of the item of clothing 50, 500 occurs therefore at the opening provided for this purpose for the application of the insert 10.

It should be noted that with respect to items of clothing of the known type, by virtue of the insert 10 it is possible to obtain an item of clothing that is breathable and also ventilated, limiting the use of three-dimensional fabrics only to the region in which the presence of the interspace is indispensable, preventing the perspiration in the vapor phase from remaining trapped between the body of the user and the item of clothing.

Furthermore, it should be noted that by using the insert, no interlinings are necessary, no cuts and stitched seams are necessary at the transitions between regions with three-dimensional fabric and regions without it, no stitched seams are required to join distinct portions of three-dimensional fabric, interrupting the continuity of the channels.

By virtue of the insert, in the manufacturing of the items of clothing one avoids handling directly the functional layer 15 alone, which, if it is constituted for example by a thin polymeric membrane, would be particularly delicate to handle, thus avoiding the risk of damage.

It should also be noted that the insert, being breathable and capable of preventing infiltrations of water from the outside owing to its own described structure, allows to provide items of clothing which in turn are breathable and are not subject to water infiltrations and also lack complex systems for adjusting perspiration or requiring user intervention.

If there is a layer of padding between the retention means and the interspace, one achieves also the advantage of increasing thermal insulation of items of winter clothing while avoiding at the same time clear and therefore unsightly variations in thickness, which are therefore difficult to manage during the manufacturing of the items of clothing.

Furthermore, the insert can be applied simply and rapidly to any jacket, coat or headgear or other item of clothing or to another manufacture for which natural ventilation is required.

In practice it has been found that the invention achieves the intended aim and objects, providing a breathable item of clothing with an adequate exchange of air, despite being structurally simple, and not subject to infiltrations of water from the outside.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102017000056188 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A breathable item of clothing, comprising:
an external enclosure, a surface of the external enclosure having at least one opening for evacuating perspiration in the vapor phase in an upper region of said item of clothing;
a breathable external covering which includes a waterproof and breathable functional layer; and
an internal layer to be directed toward a body of a user of said item of clothing, forming an interspace by virtue of means for spacing said external covering from the body of the user, for the passage of perspiration in the vapor phase, produced by the body, and channeled within said interspace, to said external covering,
wherein said external covering, said waterproof and breathable functional layer, and said internal layer are placed in a breathable preassembled insert, which is arranged at said at least one opening and is adapted to form for it a protection and a support both during assembly and during operation, and
wherein the internal layer does not overlap with the external enclosure.

2. The item of clothing according to claim 1, wherein said internal layer forms, with its structure, said spacer means.

3. The item of clothing according to claim 1, wherein said external covering includes an at least breathable external layer.

4. The item of clothing according to claim 1, wherein the waterproof and breathable functional layer includes a supporting layer.

5. The item of clothing according to claim 1 wherein said external layer is water-repellent.

6. The item of clothing according to claim 1, further comprising a breathable lining that is adapted to cover at least partially said internal layer on a side directed toward the user.

7. The item of clothing according to claim 1, wherein said lining is provided with holes for the passage of perspiration in a vapor phase produced by the body of the user to said interspace.

8. The item of clothing according to claim 1, wherein said spacer means are constituted by a three-dimensional fabric.

9. The item of clothing according to claim 1, wherein said three-dimensional fabric includes ribs interleaved with channels which form preferential passages for perspiration in the vapor phase.

10. The item of clothing according to claim 1, wherein said three-dimensional fabric includes a layer of pile-cloth material.

11. The item of clothing according to claim 1, wherein said three-dimensional fabric includes a plurality of tubes arranged mutually side by side.

12. The item of clothing according to claim 1, wherein said insert includes a central portion, which is adapted to occupy at least partially a cervical region of said item of clothing and two wings which extend on opposite sides of said central portion, wherein each of the two wings is adapted to occupy at least partially a respective region of a back below shoulders of said item of clothing.

13. A breathable item of clothing, comprising:
an external enclosure, a surface of the external enclosure having at least one opening for evacuating perspiration in a vapor phase in an upper region of said item of clothing,
a breathable external covering which includes a waterproof and breathable functional layer,
an internal layer to be directed toward a body of a user of said item of clothing, forming an interspace by virtue of means for spacing said external covering from the body of the user, for the passage of perspiration in the vapor phase, produced by the body, and channeled within said interspace, to said external covering,
wherein said external covering, said waterproof and breathable functional layer, and said internal layer are placed in a breathable preassembled insert, which is arranged at said at least one opening and is adapted to form for it a protection and a support both during assembly and during operation,
wherein the insert is joined along a perimeter of the at least one opening, and
wherein the internal layer does not overlap with the external enclosure.

* * * * *